US007738643B1

(12) United States Patent
Garrison et al.

(10) Patent No.: US 7,738,643 B1
(45) Date of Patent: Jun. 15, 2010

(54) METHOD FOR TROUBLESHOOTING ECHO ON TELECONFERENCE BRIDGE

(75) Inventors: Laurie Garrison, Oceanport, NJ (US); Bing Chen, Westfield, NJ (US); John Francis, Brooklyn, NY (US); Diane Nawrocki, Tinton Falls, NJ (US); David Nemec, Tinton Falls, NJ (US)

(73) Assignee: AT&T Corp., New York, NY (US)

( * ) Notice: Subject to any disclaimer, the term of this patent is extended or adjusted under 35 U.S.C. 154(b) by 1019 days.

(21) Appl. No.: 11/478,043

(22) Filed: Jun. 29, 2006

(51) Int. Cl.
*H04M 3/42* (2006.01)
(52) U.S. Cl. .............................. 379/203.01; 379/406.01
(58) Field of Classification Search ............ 379/406.01, 379/203.01
See application file for complete search history.

(56) References Cited

U.S. PATENT DOCUMENTS

| 4,852,161 A | * | 7/1989 | Hagiwara | 379/406.05 |
| 2007/0195698 A1 | * | 8/2007 | Briscoe et al. | 370/235 |

* cited by examiner

*Primary Examiner*—Creighton Smith

(57) ABSTRACT

This is a method for use in a teleconference that troubleshoots echo problems. After receiving a code to begin the troubleshooting process, all legs of the teleconference are muted except a test leg. That test leg is evaluated for echo. The process is repeated for each of the legs of the teleconference. After automatically measuring echo on all legs, results are reported to a moderator or host, who can take action such as muting all legs with echo, or discussing remedial action with each participant on a leg with echo.

20 Claims, 3 Drawing Sheets

METHOD FOR TROUBLESHOOTING ECHO ON TELECONFERENCE BRIDGE

FIELD OF THE INVENTION

The present invention relates generally to providing teleconference call services. More particularly, the present application relates to the automation of echo troubleshooting in a live teleconference call, and to the identification and elimination of sources of echo in a teleconference call.

BACKGROUND OF THE INVENTION

With an increased variety of access networks, customer premises equipment (CPE) and teleconferencing bridges, echo has become a serious problem in providing teleconferencing services. Currently, if there is echo on a teleconference call, participants must go through a painstaking and time-consuming effort to "manually" troubleshoot the source of the echo. That can be very difficult since most people do not fully understand echo and its sources. Further, the person on the line causing the echo cannot hear the echo, compounding the problem.

In many cases, a participant must report echo problems in a teleconference to the teleconferencing service provider, who then must provide support in real time to try to determine where the echo is originating and how best to deal with it. While manual troubleshooting takes place, the substantive work on the teleconference must be halted completely. Depending on the number of participants on the call, that delay can be substantial, resulting in a serious decrease in productivity.

Teleconferencing bridges have multiple ports or legs. Each port or leg typically connects to a single participant. The main function of the teleconference bridge is to mix all speaking participants' voices together, and to play the resulting mixture to all legs. When echo is on one leg, the echo will be mixed and then broadcast to all participants, creating a significant impairment.

The use of voice-over-IP (VoIP) CPEs, mobile phones and speakerphones all increase the probability of echo. In addition, IP teleconferencing bridges are gradually replacing TDM (time division multiplexing) bridges. The switch to IP teleconferencing from TDM teleconferencing results in a significant increase in end-to-end delay. That delay makes any echo significantly more perceptible and disruptive. The impact of the echo problem is greater in teleconferencing than in a regular two party call because the echo is heard by so many participants, and because there are more potential sources of echo in a teleconference call.

Most teleconferencing services depend on local network echo cancellers to control echo. For a variety of reasons, the echo control in the access network is often not adequate. Currently, if there is unacceptable echo in a teleconference, the teleconference participants must spend valuable teleconference time attempting to locate which leg is the source of echo, often with the help of the service provider's customer support.

The current procedure for troubleshooting an echo problem in a teleconference is to ask participants on every leg to mute their lines, then to ask each participant, one at a time, to un-mute his or her line, and then check whether echo is heard by the participants and/or customer support. Once the leg having echo is identified, the participant on that leg is asked either to mute the phone, switch to another handset or re-dial into the conference, hoping to get a better echo control connection. Because a teleconferencing call often includes over 10 or 20 people, that manual diagnostic process is time consuming, costly and inconvenient.

There therefore remains a need for a cost-effective technique to identify and cure a source of echo in a teleconferencing call, while minimizing the above-described disadvantages.

SUMMARY OF THE INVENTION

The present invention addresses the needs described above by providing a method and system for diagnosing and addressing echo problems in teleconference connections. One embodiment is a method for troubleshooting echo in a teleconference including a plurality of teleconference legs connected to a teleconference bridge. The method comprises the steps of selecting a test leg from the plurality of teleconference legs; from the teleconference bridge, muting all teleconference legs except the test leg; from the teleconference bridge, transmitting a test signal to the test leg; from the teleconference bridge, measuring echo on the test leg; and repeating the selecting, muting, transmitting and measuring steps for each leg of the teleconference legs.

The method may further include the step of, at the teleconference bridge, receiving an instruction code to begin the method. The instruction code may be a telephone keypad sequence.

The method may further comprise the step of playing an announcement to participants in the teleconference. The announcement may include an instruction to un-mute the phone.

The method may include the step of comparing the measured echo in each leg with a predetermined echo threshold to determine whether a leg has unacceptable echo. A report may be transmitted indicating which teleconference legs have unacceptable echo. In that case, the method may include the steps of receiving a code to mute selected teleconference legs; and muting the selected teleconference legs. Alternatively, each teleconference leg having unacceptable echo may be automatically muted.

Another embodiment of the invention is a method for troubleshooting echo in a teleconference including a plurality of teleconference legs. The method comprises the steps of receiving a code to initiate an echo test; playing an announcement of the test to each of the teleconference legs; selecting a test leg from the plurality of teleconference legs; muting all teleconference legs except the test leg; transmitting a test signal to the test leg; measuring echo on the test leg; repeating the selecting, muting, transmitting and measuring steps for each leg of the teleconference legs; and transmitting a report including results of the measuring step.

The code in that method may be a telephone keypad sequence. The announcement may include an instruction to un-mute a phone.

That method may further include the step of comparing the measured echo in each leg with a predetermined echo threshold to determine whether a leg has unacceptable echo.

The report may include which teleconference legs have unacceptable echo. In that case, the method may include the steps of receiving a code to mute selected teleconference legs; and muting the selected teleconference legs.

The method may further include the step of muting each teleconference leg having unacceptable echo.

Another embodiment of the invention is a teleconference bridge for connecting a plurality of teleconference legs and troubleshooting echo in a teleconference. The teleconference bridge includes means for muting all teleconference legs except a test leg; means for transmitting a test signal to the test leg; means for measuring echo on the test leg; and means for activating each of the muting, transmitting and measuring means for each teleconference leg.

The teleconference bridge may further comprise means for receiving an instruction code to begin troubleshooting echo, in which case the instruction code may be a telephone keypad sequence.

The teleconference bridge may further include means for playing an announcement pertaining to the echo troubleshooting to participants in a teleconference.

DESCRIPTION OF THE INVENTION

Figure 1:
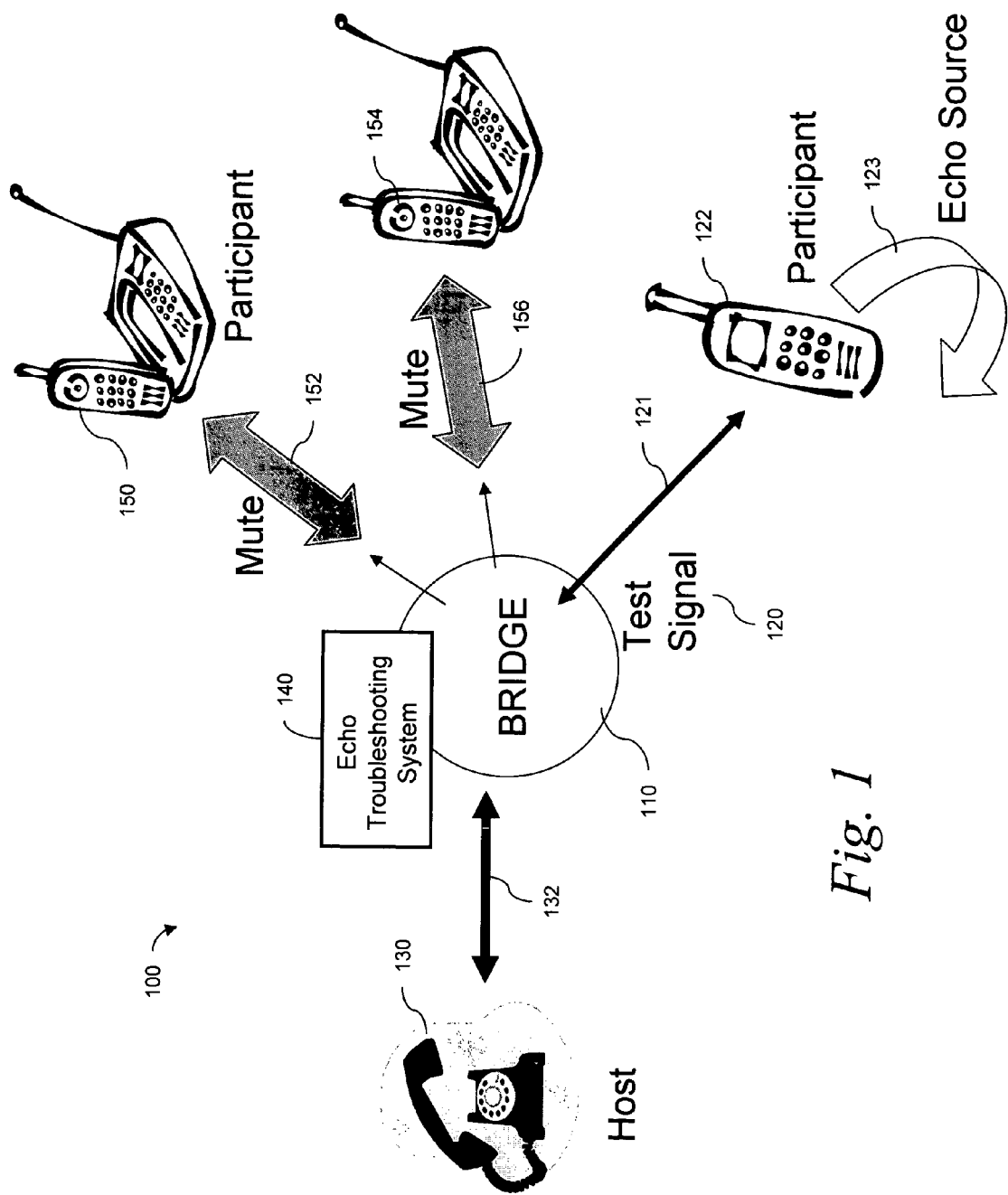
FIG. 1 is a schematic representation of a telecommunications system including a teleconference bridge.

The inventors have developed a method and apparatus for conducting an improved echo troubleshooting process. A telecommunications system 100, according to one embodiment of the invention, is shown in FIG. 1.

The telecommunications system 100 includes a teleconference bridge 110 over which is being conducted an ongoing teleconference. A plurality of teleconference legs 121, 152, 156 are each connected to the bridge 110. Each leg includes a CPE 122, 150, 154.

An additional leg 132 may include a host 130. The host may be associated with the provider of the bridge 110, in which case the host is responsible for troubleshooting technical problems that may arise during the teleconference, including the echo problem to which the system and method of the present invention is addressed. Alternatively, the host may be one of the teleconference participants, or may be a third party. In that case, the host may have little technical knowledge of the system. In the event of a technical problem, such a host would call a service provider operator who has control of the bridge and could start the troubleshooting technique of the invention.

The method automates echo troubleshooting on live teleconferencing calls, by testing each leg individually and measuring its echo response. In one embodiment, once each leg is tested, the system decides which leg or legs have echo, and reports its findings back to a host. The host can then choose to have the system automatically mute the trouble leg, or the host can decide to have the participant on the trouble leg re-dial in, or some other solution.

As shown in FIG. 1, when participants such as those using CPEs 122, 150, 154 notice echo, the host 130 or service provider operator is informed. The host or the service provider operator initiates the method of the invention by keying a specific sequence or code on a telephone keypad, such as *77. That code activates the echo troubleshooting system 140 in the bridge 110 to launch the echo troubleshooting method.

The echo troubleshooting system 140 plays an announcement to all participants (CPEs 122, 150, 154) informing them that a test is about to be initiated. The message may tell the participants what to expect, and may request that each participant un-mute the phone. The echo troubleshooting system 140 then mutes all legs 152, 154 except one, which is the "test leg" 121.

A test signal 120 is then sent from the echo troubleshooting system 140 to the test leg 121 to assess the echo response of the test leg. In a preferred embodiment, the test signal is sent only to the test leg 121 and not to the other legs 152, 156. In that way, the test signal is not heard by all teleconference participants during the test of each leg. In another embodiment, the test signal is sent to all legs simultaneously, but no echo is generated on the muted legs 152, 156.

The resulting echo is then measured by the echo troubleshooting system 140. Any measured echo must originate in the test leg, because the other legs are muted. Measured levels of the resulting echo, together with the associated leg/port number, are recorded. The procedure is then repeated for each leg, muting all legs but the current test leg.

After all legs are tested, the system calculates which leg or legs have echo. To make that calculation, the measured echo level for each leg may be compared with a maximum acceptable value, over which echo is considered unacceptable. A report is then transmitted back to the host enumerating which leg or legs have echo. Alternatively, the system may transmit a report listing an echo level for each leg regardless of magnitude.

The host or service provider operator may then take some action based on the echo report from the system. In one embodiment, another code is transmitted to the bridge, prompting the bridge to mute those legs with echo. Alternatively, the problem is handled manually, by discussing a course of action with the participants.

Figure 2:
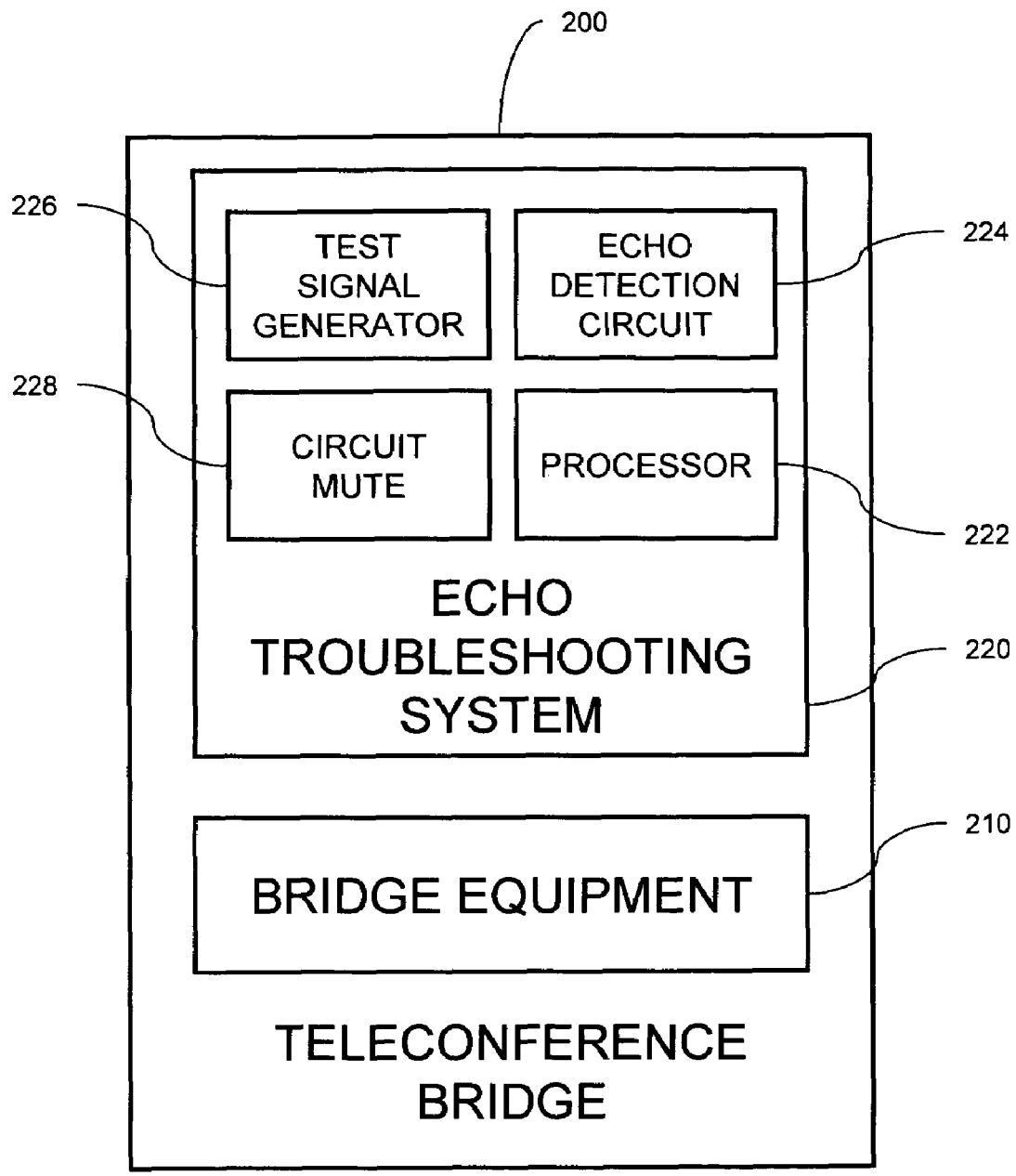
FIG. 2 is a schematic representation of a teleconference bridge according to one embodiment of the invention.

A teleconference bridge 200 in accordance with one embodiment of the invention is shown in FIG. 2. In addition to known telecommunications bridge equipment 210, the teleconference bridge 200 also contains an echo troubleshooting system 220. While the troubleshooting system 220 is described herein and shown in FIG. 2 to be integral with a defined teleconference bridge 200, is will be understood by those skilled in the art that the echo troubleshooting system 220 may be located remotely from, but in communication with and control of, the bridge 200. It should further be understood that components of the echo troubleshooting system 220 and the bridge equipment 210, and the components of any other subsystem of the teleconference bridge 200, are not necessarily centralized subsystems as shown in FIG. 2, but may instead be distributed systems existing as components of other linked but separate systems.

The echo troubleshooting system 220 includes a test signal generator 226 for generating the echo test signal. The generator may be capable of playing the test signal through a single leg at a time, or may connect to all legs simultaneously.

The generated test signal may be one or more tones having frequencies typical of those of human speech, or those defined in the ITU standard G.168, or any other test signal that could be used to best evaluate echo.

The circuit mute 228 is capable of selectively muting the legs individually from the bridge. A "muted" leg has at least one of the two directional communication channels disconnected. In a most common example, a muted leg permits a participant to hear the signal from the bridge, but does not allow a participant to add any signal to the summed bridge signal. Thus, a "muted" leg cannot have echo.

Unlike muting in existing manual echo diagnostic techniques, in which participants mute their CPEs at the request of a host, the circuit mute 228 operates at the bridge end of the teleconference leg. In that way, muting may be performed automatically and consistently.

The echo detection circuit 224 measures echo in each of the legs individually, as described above. The detection circuit 224 may use digital techniques to recognize audible echo, and to differentiate echo from normal speech and background noise.

A processor 222 in the bridge 200 controls the operation of the other components of the echo troubleshooting system 220. For example, the processor instructs the bridge to sequentially activate the circuit mute 228 to mute all but the test leg, then activates the test signal generator 226 to transmit a test signal in the test leg, and then activates the echo detection circuit 224 to detect echo in the test leg. The processor then performs communications tasks with the host as described above. The processor also initiates the diagnostic sequence at the request of the host, formats and stores the measured data, and performs corrective muting as explained above.

Figure 3:
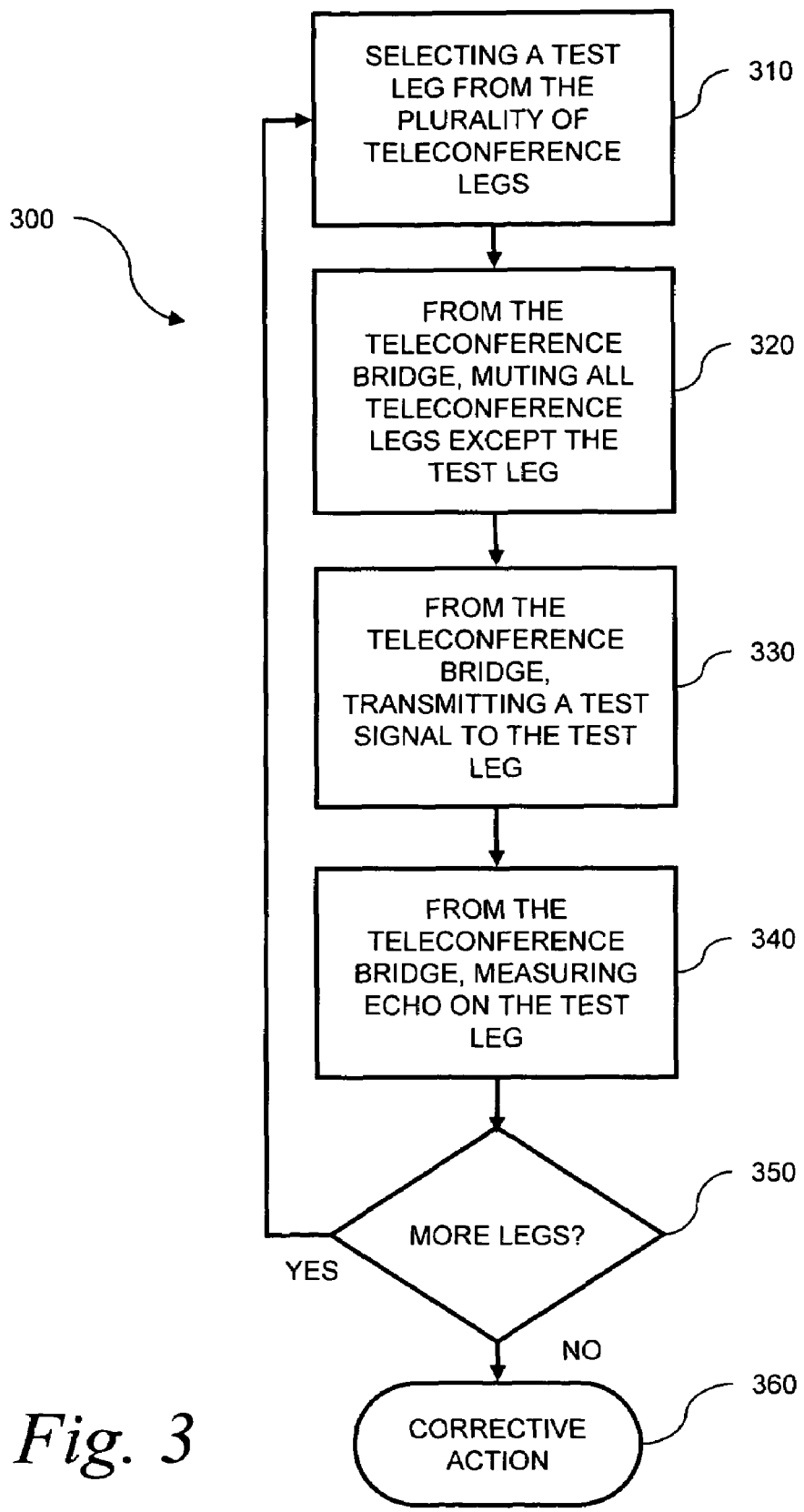
FIG. 3 is a flow chart depicting a method according to one embodiment of the invention.

An exemplary method 300 according to one embodiment of the invention is now described with reference to the flow chart of FIG. 3. In a first step 310 of the method, a test leg is selected from the plurality of teleconference legs.

The following three steps 320, 330, 340 are performed from the teleconference bridge. By performing those steps from the bridge, consistency among the echo measurements is assured, and the method may be performed with a minimum of disruption to the teleconference. In step 320, all teleconference legs except the test leg are muted. As that step is performed by the teleconference bridge, it is not necessary to request the individual teleconference participants to mute their CPEs.

A test signal is then transmitted (step 330) to the test leg. The signal may be generated by a signal generator in the bridge, or may be transmitted from a remote location.

The echo on the test leg is then measured (step 340). By measuring the echo at the teleconference bridge, a non-subjective evaluation of echo is possible. Because the echo is measured from the teleconference bridge for all legs, the measurement is consistent; i.e., echo determinations of a given leg may differ if measured from different legs. Such is the case where teleconference participants subjectively judge the existence of echo from their respective CPEs.

The selecting, muting, transmitting and measuring steps are repeated (step 350) for each leg of the teleconference legs, and the method is terminated after all legs are measured. Comparable measurements are therefore available for evaluation and comparison. Corrective action may then be taken (step 360) based on the measurements.

The system and method of the invention provide a new teleconference service diagnostic feature to troubleshoot echo problems in a fast, accurate and time-efficient way, enabling teleconference service providers to provide high quality service. Given the rapid increase in the use of IP teleconference bridges and CPEs, the method has great potential in future systems.

The method furthermore reduces the need for real-time human service provider support. It also requires no special knowledge of the participants; for example, participants do not need to understand echo or the teleconference platform. The method greatly reduces the time required to identify and correct an echo problem in an ongoing teleconference.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to an echo troubleshooting system residing within a teleconference bridge, the method and apparatus of the invention may be instead embodied by a stand-alone system that is connected to a teleconference bridge as a leg, for example. It is further noted that the invention is not limited to use with TDM and IP bridges, as described in this specification, but can be used with any teleconferencing technology existing today or developed in the future. It is to be understood that the embodiments shown and described herein are only illustrative of the principles of the present invention and that various modifications may be implemented by those skilled in the art without departing from the scope and spirit of the invention.

What is claimed is:

1. A method for troubleshooting echo in a teleconference including a plurality of teleconference legs connected to a teleconference bridge, the method comprising the steps of:
    selecting a test leg from the plurality of teleconference legs;
    from the teleconference bridge, muting all teleconference legs except the test leg;
    from the teleconference bridge, transmitting a test signal to the test leg;
    from the teleconference bridge, measuring echo on the test leg; and
    repeating the selecting, muting, transmitting and measuring steps for each leg of the teleconference legs.

2. The method of claim 1, further comprising the step of:
    at the teleconference bridge, receiving an instruction code to begin the method.

3. The method of claim 2, wherein the instruction code is a telephone keypad sequence.

4. The method of claim 1, further comprising the step of:
    playing an announcement to participants in the teleconference.

5. The method of claim 4, wherein the announcement includes an instruction to un-mute the phone.

6. The method of claim 1, further comprising the step of:
    comparing the measured echo in each leg with a predetermined echo threshold to determine whether a leg has unacceptable echo.

7. The method of claim 6, further comprising the step of:
    transmitting a report indicating which teleconference legs have unacceptable echo.

8. The method of claim 7, further comprising the steps of:
    receiving a code to mute selected teleconference legs; and
    muting the selected teleconference legs.

9. The method of claim 6, further comprising the step of:
    muting each teleconference leg having unacceptable echo.

10. A method for troubleshooting echo in a teleconference including a plurality of teleconference legs, the method comprising the steps of:
    receiving a code to initiate an echo test;
    playing an announcement of the test to each of the teleconference legs;
    selecting a test leg from the plurality of teleconference legs;
    muting all teleconference legs except the test leg;
    transmitting a test signal to the test leg;
    measuring echo on the test leg;
    repeating the selecting, muting, transmitting and measuring steps for each leg of the teleconference legs; and
    transmitting a report including results of the measuring step.

11. The method of claim 10, wherein the code is a telephone keypad sequence.

12. The method of claim 10, wherein the announcement includes an instruction to un-mute a phone.

13. The method of claim 10, further comprising the step of:
    comparing the measured echo in each leg with a predetermined echo threshold to determine whether a leg has unacceptable echo.

14. The method of claim 13, wherein the report includes which teleconference legs have unacceptable echo.

15. The method of claim 14, further comprising the steps of:
receiving a code to mute selected teleconference legs; and
muting the selected teleconference legs.

16. The method of claim 13, further comprising the step of:
muting each teleconference leg having unacceptable echo.

17. A teleconference bridge for connecting a plurality of teleconference legs and troubleshooting echo in a teleconference, comprising:
means for muting all teleconference legs except a test leg;
means for transmitting a test signal to the test leg;
means for measuring echo on the test leg; and
means for activating each of the muting, transmitting and measuring means for each teleconference leg.

18. The teleconference bridge of claim 17, further comprising:
means for receiving an instruction code to begin troubleshooting echo.

19. The teleconference bridge of claim 18, wherein the instruction code is a telephone keypad sequence.

20. The teleconference bridge of claim 17 further comprising:
means for playing an announcement pertaining to the echo troubleshooting to participants in a teleconference.

* * * * *